US011519446B2

(12) United States Patent
Liebelt et al.

(10) Patent No.: US 11,519,446 B2
(45) Date of Patent: Dec. 6, 2022

(54) FASTENER FEEDBACK FEATURE

(71) Applicant: ILLINOIS TOOL WORKS INC., Glenview, IL (US)

(72) Inventors: Scott Liebelt, Eau Claire, WI (US); Jason Zander, Roberts, WI (US)

(73) Assignee: Illinois Tool Works Inc., Glenview, IL (US)

( * ) Notice: Subject to any disclaimer, the term of this patent is extended or adjusted under 35 U.S.C. 154(b) by 166 days.

(21) Appl. No.: 16/662,909

(22) Filed: Oct. 24, 2019

(65) Prior Publication Data
US 2020/0141440 A1 May 7, 2020

Related U.S. Application Data

(60) Provisional application No. 62/755,885, filed on Nov. 5, 2018.

(51) Int. Cl.
*F16B 21/08* (2006.01)
*F16B 21/07* (2006.01)

(52) U.S. Cl.
CPC ............ *F16B 21/086* (2013.01); *F16B 21/07* (2013.01)

(58) Field of Classification Search
CPC ....... F16B 21/086; F16B 21/07; F16B 21/075
USPC ......................................................... 411/508
See application file for complete search history.

(56) References Cited

U.S. PATENT DOCUMENTS

| 2,650,516 | A | * | 9/1953 | Ougljesa | ............... | F16B 13/122 |
| | | | | | | 411/508 |
| 3,164,054 | A | | 1/1965 | Biesecker | | |
| 4,431,355 | A | * | 2/1984 | Junemann | ........... | F16B 19/1081 |
| | | | | | | 411/15 |
| D273,091 | S | | 3/1984 | Kurosaki | | |
| 4,487,998 | A | | 12/1984 | Pegram | | |
| 4,675,937 | A | | 6/1987 | Mitomi | | |
| 4,927,287 | A | | 5/1990 | Ohkawa et al. | | |
| 4,952,106 | A | * | 8/1990 | Kubogochi | ......... | F16B 19/1081 |
| | | | | | | 411/48 |
| 4,953,269 | A | | 9/1990 | Ragsdale | | |
| 5,294,225 | A | | 3/1994 | Kazino et al. | | |
| 5,375,954 | A | | 12/1994 | Eguchi | | |
| 5,435,679 | A | | 7/1995 | Barry | | |
| 5,499,737 | A | | 3/1996 | Kraus | | |
| 5,507,610 | A | | 4/1996 | Benedetti et al. | | |

(Continued)

FOREIGN PATENT DOCUMENTS

CN 104806605 A 7/2015
CN 106351930 A 1/2017
(Continued)

OTHER PUBLICATIONS

European Search Report from Application No. 20150033.7, dated May 12, 2020. (8 pages).

*Primary Examiner* — Flemming Saether
(74) *Attorney, Agent, or Firm* — Quarles & Brady LLP

(57) ABSTRACT

A fastener or grommet is configured to securely clamp together one or more components. The fastener includes a body having a longitudinal axis and at least one wall. The body further includes two arms extending from the body on opposite sides at a flexure joint. Each of the arms includes a feedback feature that causes hesitation in the fastener during installation. The feedback feature further comprises an arched profile that extends the entire width of each of the arms.

15 Claims, 11 Drawing Sheets

(56) References Cited

U.S. PATENT DOCUMENTS

| | | | |
|---|---|---|---|
| 5,632,581 A | 5/1997 | Hasada | |
| 5,727,761 A * | 3/1998 | Ho | H05K 7/142 |
| | | | 248/222.12 |
| 5,795,118 A | 8/1998 | Osada et al. | |
| 5,850,676 A | 12/1998 | Takahashi et al. | |
| 5,887,319 A * | 3/1999 | Smith | F16B 5/0642 |
| | | | 24/293 |
| 5,975,820 A | 11/1999 | Kirchen | |
| 5,980,180 A | 11/1999 | Schiess | |
| 6,364,586 B1 | 4/2002 | Okada | |
| 6,431,585 B1 | 8/2002 | Rickabus et al. | |
| 6,507,976 B2 | 1/2003 | Ichimaru | |
| 6,616,479 B1 | 9/2003 | Jones | |
| 7,019,215 B2 * | 3/2006 | Arai | F16B 21/086 |
| | | | 174/135 |
| 7,033,121 B2 | 4/2006 | Kirchen | |
| 7,105,750 B1 | 9/2006 | Duhr | |
| 7,114,217 B2 | 10/2006 | Matsuzawa et al. | |
| 7,207,759 B2 | 4/2007 | Kato | |
| 7,287,945 B2 * | 10/2007 | Lubera | F16B 5/065 |
| | | | 24/295 |
| 7,428,770 B2 * | 9/2008 | Dickenson | F16B 5/0614 |
| | | | 24/289 |
| 7,690,876 B2 | 4/2010 | Kawai et al. | |
| 8,037,582 B2 | 10/2011 | Okada et al. | |
| 8,043,038 B2 * | 10/2011 | Sano | F16B 19/1081 |
| | | | 411/45 |
| D665,245 S | 8/2012 | Nakazato | |
| 8,245,367 B2 | 8/2012 | Kato et al. | |
| 8,348,568 B2 | 1/2013 | Murakami | |
| 8,572,805 B2 | 11/2013 | Inoue | |
| 8,662,807 B2 | 3/2014 | Adachi | |
| 8,769,779 B2 | 7/2014 | Lee | |
| 8,961,092 B2 | 2/2015 | De Jong et al. | |
| 9,061,379 B1 | 6/2015 | Mead et al. | |
| 9,115,743 B2 | 8/2015 | Yamamoto | |
| 9,303,672 B2 | 4/2016 | Lepper | |
| 9,440,596 B2 * | 9/2016 | Huelke | B60R 13/0206 |
| 9,879,707 B2 | 1/2018 | Watanabe | |
| D824,747 S | 8/2018 | Briese et al. | |
| 10,113,577 B2 | 10/2018 | Kanie | |
| 10,125,803 B2 * | 11/2018 | Aikawa | F16K 27/003 |
| 10,396,489 B2 | 8/2019 | Mizuno et al. | |
| 10,451,100 B2 | 10/2019 | Flynn | |
| 2002/0026693 A1 | 3/2002 | Akema et al. | |
| 2002/0094253 A1 | 7/2002 | Enomoto et al. | |
| 2004/0013481 A1 | 1/2004 | Jeppesen | |
| 2004/0020016 A1 | 2/2004 | Yoneoka | |
| 2006/0171793 A1 | 8/2006 | Kawai et al. | |
| 2007/0272807 A1 * | 11/2007 | Takagaki | H02G 3/32 |
| | | | 248/71 |
| 2007/0289770 A1 | 12/2007 | Koike | |
| 2008/0298925 A1 | 12/2008 | Shinozaki | |
| 2008/0298927 A1 * | 12/2008 | Chen | F16B 21/086 |
| | | | 411/495 |
| 2010/0162534 A1 | 7/2010 | Kato | |
| 2011/0014005 A1 | 1/2011 | Shinozaki | |
| 2012/0057948 A1 | 3/2012 | Jeon | |
| 2012/0210546 A1 | 8/2012 | Jang et al. | |
| 2012/0230796 A1 | 9/2012 | McClure | |
| 2014/0047679 A1 | 2/2014 | Lepper et al. | |
| 2014/0099156 A1 | 4/2014 | Weber | |
| 2016/0348707 A1 | 12/2016 | Wu | |
| 2020/0141440 A1 | 5/2020 | Liebelt et al. | |
| 2020/0217345 A1 | 7/2020 | Liebelt | |

FOREIGN PATENT DOCUMENTS

| | | |
|---|---|---|
| DE | 3931180 A1 | 4/1990 |
| DE | 3931180 A1 | 8/1990 |
| DE | 9016032 U1 | 2/1991 |
| EP | 2719907 A1 | 4/2014 |
| EP | 2722534 A1 | 4/2014 |
| FR | 2804183 A1 | 7/2001 |

* cited by examiner

FASTENER FEEDBACK FEATURE

CROSS REFERENCE TO RELATED APPLICATIONS

This application is based on, claims priority to, and incorporates herein by reference in its entirety U.S. Provisional Application Ser. No. 62/755,885, filed on Nov. 5, 2018, and entitled "Fastener Feedback Feature".

FIELD OF EMBODIMENTS OF THE DISCLOSURE

The present disclosure relates to fasteners and, more particularly, to grommet or fastener feedback features that assist in securing one or more components together, such as panels within or around a vehicle that are secured together during the manufacturing process of the vehicle.

BACKGROUND

Fasteners may be used to secure components together. Grommets are a type of fastener that typically comprise a ring or edge strip, are generally flared or collared on each side to keep the grommet in place, and are often made of metal, plastic, or rubber. In some instances, grommets may be used to prevent tearing or abrasion of pierced material, to cover sharp edges of the piercing, to protect the insulation of wire, cable, or lines being routed therethrough, or for securing components together.

In the automotive context, grommet fasteners may be used to securely connect a first panel to a second panel by adhesively securing the grommet to the first panel and by snapably securing the grommet through a hole formed in the second panel. Many known grommets require a constant high force and slow acceleration when inserting the grommet into a component. Further, many prior art grommets do not expressly indicate to an operator when it is installed.

A need therefore exists for a grommet to have a quick release that causes rapid acceleration of the clip and greater impact on the panel during full installation. Further, a need exists to provide additional audible and tactile feedback to an operator during installation.

SUMMARY

In one aspect, a grommet includes a body defining a longitudinal axis and that has a wall, the wall defining an inner surface. The grommet further includes a collar extending from the body and away from the longitudinal axis, and a plurality of legs extending from the body. The grommet also includes a plurality of arms extending from the body at a flexure joint, each of the plurality of arms includes a feedback feature. The feedback feature serves as a catch point that causes hesitation and quick release of the grommet during installation.

In related embodiments, the feedback feature can be defined as a protrusion. The protrusion may comprises a semi-circular shape and extend outwardly from an angled wall on each of the plurality of arms. Further, the protrusion may extend along an entire width of each of the plurality of arms and can be parallel with a circumference defined by the wall of the body. Alternatively, the feedback feature can be defined as a notch extending into each of the plurality of arms. The notch may comprise a vertical wall and a horizontal wall. The horizontal wall may be perpendicular to the vertical wall. Further, each of the plurality of arms may comprise a lip that is positioned in contact with the horizontal wall. The lip and the notch may define an arched profile. Furthermore, the feedback feature may provide an audible and tactile feedback to an operator during installation.

In another aspect, a grommet comprises a body that includes a wall, the wall defined by a passageway through the body, and a plurality of arms extending from the body at a flexure joint. The grommet further includes a feedback feature positioned on an angled wall on each of the plurality of arms. The feedback feature serves as a catch point on a component, and causes hesitation and quick release of the grommet during installation. The body further comprises a plurality of windows that extend partially around the plurality of arms.

In some embodiments, the component may comprise an aperture that extends through the component. The aperture may be defined by an internal edge, and a portion of the internal edge of the aperture may be caught by the feedback feature. Each of the plurality of arms may comprise an angled ledge and an angled wall that extends outwardly from the flexure joint. The angled ledge and the angled wall may define an elbow therebetween. Further, the elbow may be defined by a flat surface that is parallel with a circumference defined by the body. Each of the plurality of arms may comprise a finger that extends upwardly from an upper surface of each of the plurality of arms. The finger may comprise a depression that extends into the finger. Furthermore, each of the plurality of arms may be flexible between a first position in which the elbow is positioned farther away from a longitudinal access defined by the body than the feedback feature, and a second position in which the elbow is vertically aligned with the feedback feature.

In a further aspect, the present disclosure provides a fastener that has a body defined by a longitudinal axis, which includes at least one wall. The fastener further includes two arms extending from the body on opposite side at a flexure joint, and each of the arms include a feedback feature that causes hesitation in the fastener during installation. The feedback feature comprises an arched profile that extends the entire width of each of the arms.

In related embodiments, the feedback feature may be a protrusion extending outwardly from an angled wall of each of the arms. Alternatively, the feedback feature may be a notch that extends into an angled wall of each of the arms. Further, the notch may comprise two walls that are perpendicular to each other.

DETAILED DESCRIPTION

Figure 1:
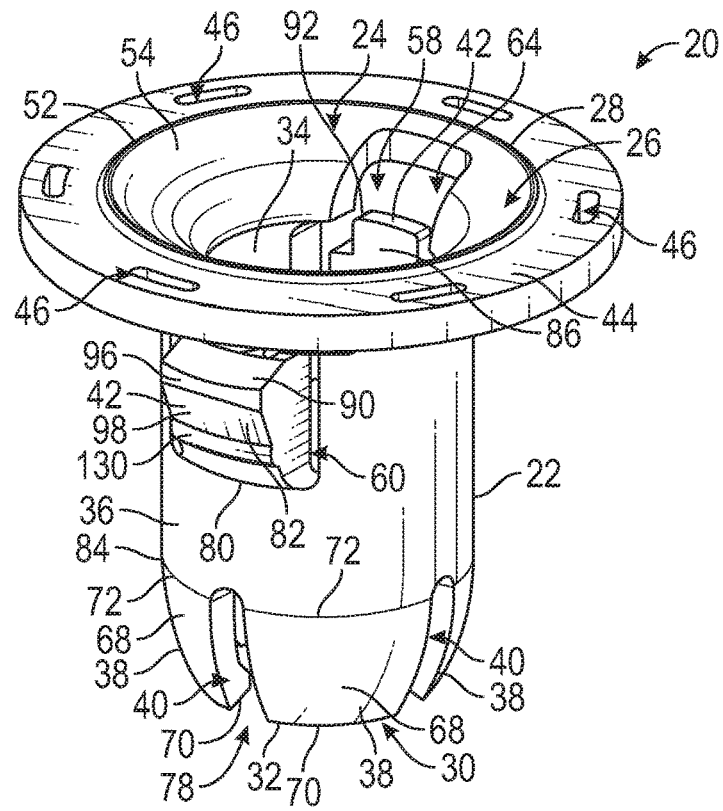
FIG. 1 is a top isometric view of a grommet, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

Embodiments of the present disclosure provide for a grommet with a specialized feedback feature. Specifically, the feedback feature is positioned on arms, i.e., box prongs, of the grommet and trap a portion of a panel underneath it. As such, the feature serves as a catch point causing hesitation and quick release of the grommet during installation. Further, the quick release causes rapid acceleration of the clip and greater impact on the panel during full install. As a result, the feedback feature provides additional audible and tactile feedback to an operator who is installing the grommet.

Figure 2:
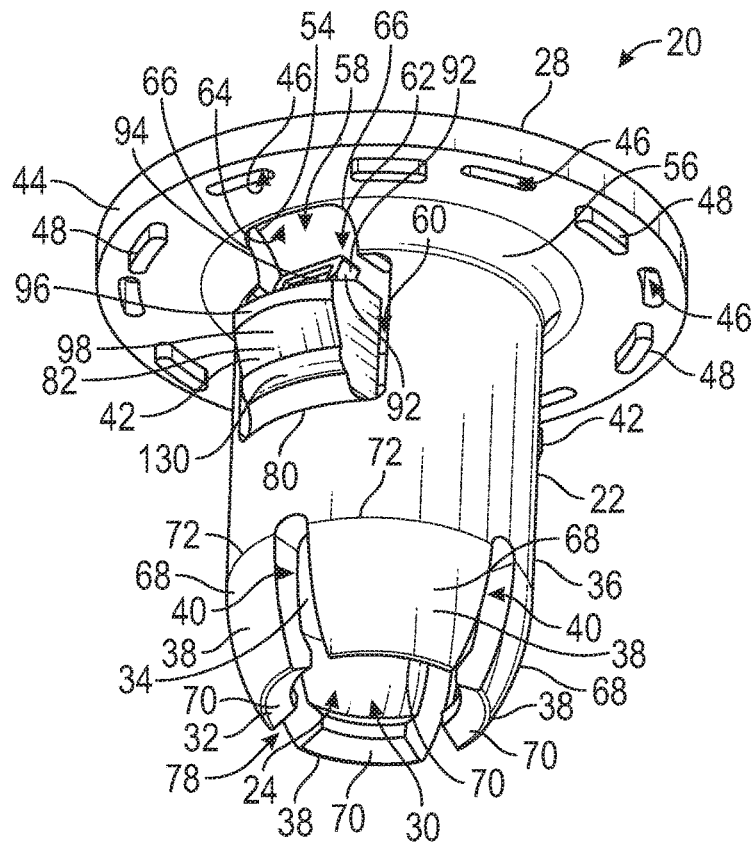
FIG. 2 is a bottom isometric view of the grommet of FIG. 1.
Figure 3:
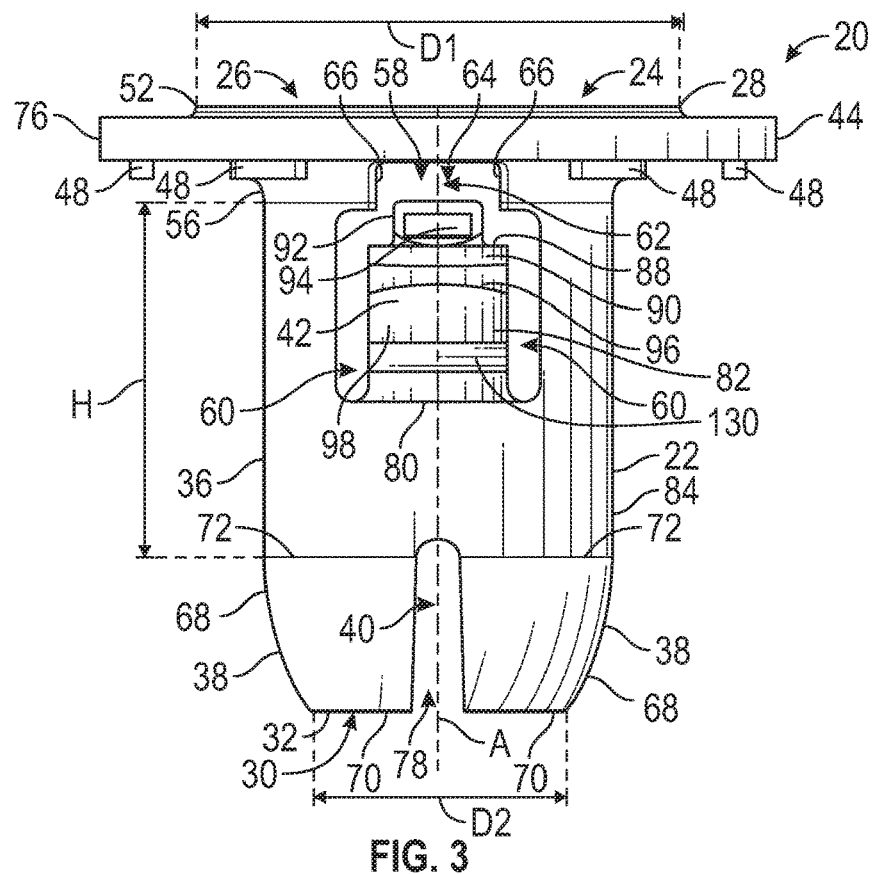
FIG. 3 is a side elevational view of the grommet of FIG. 1.

FIGS. 1-6 illustrate a fastener or grommet 20 in accordance with the present disclosure. Referring to FIGS. 1 and 2, a top perspective view and a front view of the grommet 20 are shown, respectively. FIG. 1 illustrates a top perspective view of the grommet 20 that includes a body 22, the body 22 being generally cylindrical. The grommet 20 is integrally molded and formed as a single piece of material, such as injection-molded plastic. Further, the grommet 20 includes a passageway 24 defined by a first or upper opening 26 at a first or upper end 28 and a second or lower opening 30 at a second or bottom end 32. The passageway 24 is partially defined by an inner surface 34 of a wall 36 of the body 22 that is generally cylindrical or may be slightly tapered, the wall 36 extending between the upper opening 26 and the lower opening 30, with several interrupted portions, as outlined in greater detail below. Referring to FIG. 3, the upper opening 26 has a diameter D1 that is larger than a diameter D2 of the lower opening 30. Further, the body 22 is defined by a longitudinal axis A extending through a center of the passageway 24.

Referring again to FIGS. 1 and 2, a plurality of legs 38 extend from the body 22 adjacent the lower opening 30. The legs 38 are separated by a plurality of longitudinal slots 40 which generally define the legs 38. Still further, a plurality of arms 42 extend outward from the body 22. In preferred embodiments, a collar 44 is disposed peripherally about the upper end 28 of the body 22, and extends radially outward from the longitudinal axis. A plurality of elongate apertures 46 are provided within the collar 44, which may provide for attachment of the grommet 20 to an object, such as a steel panel (not shown). Additionally, a plurality of nubs 48 extend downwardly from a bottom portion of the collar 44, between each of the apertures 46. The nubs 48 can assist in securing a component 50 to the grommet 20 (see FIG. 9). The plurality of elongate apertures 46 and nubs 48 may be provided in a number of different configurations, and any number of elongate apertures 46 or nubs 48 may be included. Alternatively, the grommet 20 may not include the apertures 46 or the nubs 48 along the collar 44. In this embodiment, a flange 52 extends outwardly from an intersection of the collar 44 and the body 22, in a direction that is substantially parallel with respect to the longitudinal axis A. For example, the flange 52 may be formed with a funneled wall 54 that extends to the inner surface 34 of the wall 36.

Referring specifically to FIG. 2, the body 22 of the grommet 20 is shown more clearly, and a fillet 56 that forms a connection between the collar 44 and the body 22 is illustrated. The fillet 56 extends radially about the longitudinal axis A, and is interrupted at diametrically opposed front and rear sides by a plurality of windows 58 that define openings within the body 22 of the grommet 20. As will be discussed in further detail, the windows 58 extend partially around the arms 42 of the body 22. While the present embodiment includes two of the windows 58, the same reference numbers apply to like elements of each of the windows 58 as described hereinafter below. As such, only a single window 58 is described and referred to herein, however, the windows 58 are identical, and the description of one relates to the description of the other.

Still referring to FIG. 2, the window 58 extends from the collar 44 toward the bottom end 32 of the body 22, the window 58 being in the shape of a tuning fork. Referring to FIG. 3, the window 58 comprises first and second lateral segments 60 that are generally longitudinal and parallel with respect to one another, a central segment 62 that joins and is orthogonal with respect to the lateral segments 60, and a top portion 64 that is defined by outwardly extending intermediate sides 66 of the body 22 that extend generally parallel from the central segment 62 toward the fillet 56. The lateral segments 60 and the central segment 62 generally define a profile within which the arms 42 are disposed. The two arms 42 are also identical, and only one of the arms 42 will be described hereinafter for ease of description. Further, in alternative embodiments, the grommet 20 may comprise any number of arms 42 extending from the body 22.

As illustrated in FIG. 2, the grommet 20 may include four of the legs 38 that extend from the body 22. Alternatively, the grommet 20 may include more or fewer legs 38 than shown. The slots 40 are formed between the legs 38. Each of the legs 38 may include an extension beam 68 and an inwardly-canted tip 70 extending from the extension beam 68. In operation, the securing legs 38 are configured to outwardly pivot about flexure joints 72 that connect the legs 38 with the body 22 as a tool or other object is moved into the central passageway 24. The slots 40 may extend along varying heights of the grommet 20 and need not be limited to the sizes illustrated in the figures. In some embodiments, a height H (see FIG. 3) of the body 22 is reduced and the slots 40 maintain the same length, thus, the slots 40 extend along a greater proportion of the grommet 20. Additionally, the securing legs 38 are capable of pivoting inwardly at the flexure joints 72 in order to secure the grommet 20 into an aperture 74 extending through the component 50, such as a panel (see FIG. 7).

Figure 4:
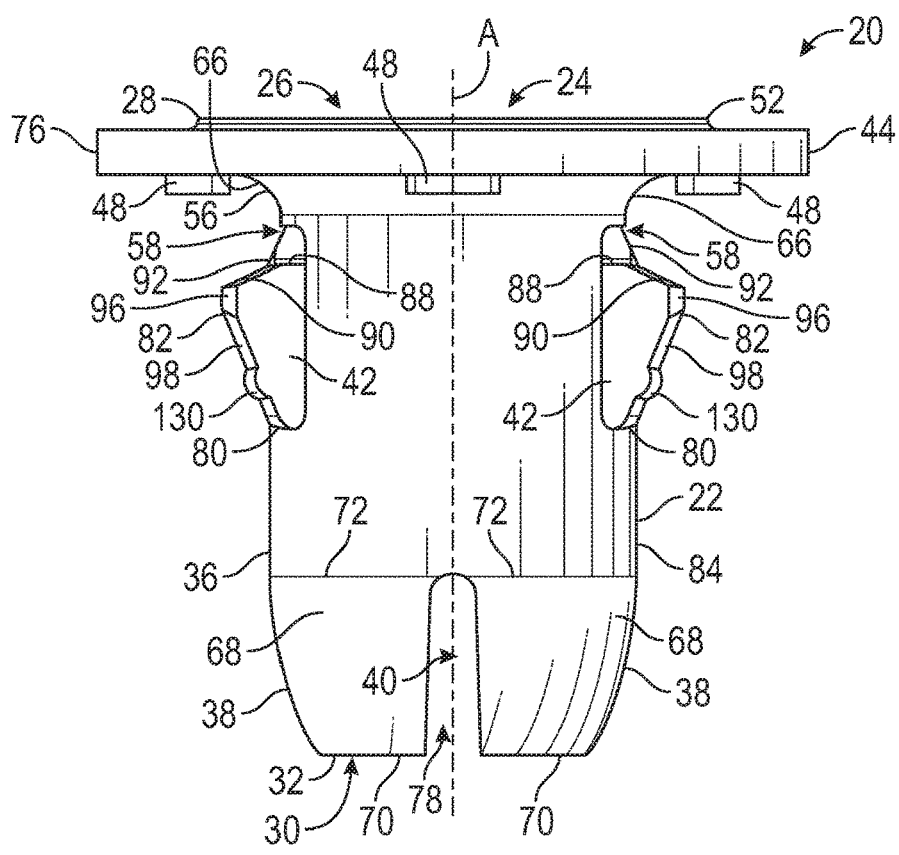
FIG. 4 is a front elevational view of the grommet of FIG. 1.

Referring specifically to FIGS. 3 and 4, side and front elevational views of the grommet 20 are shown. Referring specifically to FIG. 3, a side of the grommet 20 is shown in greater detail. Specifically referring to the upper end 28 of the grommet 20, the flange 52 is shown in elevation, the flange 52 having a generally frusto-conical profile, extending slightly inward, toward the longitudinal axis A. The collar 44 is also shown in elevation, the collar 44 being generally cylindrical in nature and having a peripheral side 76 that extends in a direction collinear with respect to the longitudinal axis A. The fillet 56 at the connection between the collar 44 and the body 22 is also shown more clearly, the fillet 56 being generally rounded. The fillet 56 is interrupted on opposing sides by the top portions 64 of the windows 58. The body 22 extends downward from the fillet 56 and is interrupted by the segments 60 of the window 58. The arm 42 extends upward from where it intersects the body 22. One of the slots 40 that define the legs 38 is also shown, the slot 40 having a mouth 78 adjacent the bottom end 32 that is wider than a portion of the slot 40 that extends into the body 22.

Referring to FIG. 4, a front of the grommet 20 is shown in greater detail. The flange 52, the collar 44, and the illustrated slot 40 are disposed in generally the same orientation as the same elements depicted in FIG. 3. When viewed from the front, the fillet 56 is generally interrupted by the windows 58, and the arms 42 extend outward from the body 22. As described in greater detail hereinafter below, the arms 42 are flexible and are formed to retract into the passageway 24 of the grommet 20 when drawn through an aperture 74 of the component 50 (see FIG. 8). An intersection or flexure joint 80 between the arms 42 and the body 22 is generally flexible, and allows the arms 42 to retract inward, once a force is applied, to a retracted position where an outer surface 82 of the arms 42 is generally flush with an outer surface 84 of the body 22. Further, in preferred embodiments the arms 42 may extend from the body 22 on opposing sides.

Referring back to FIGS. 3 and 4, the arms 42 are shown extending from the joints 80 outward, away from the longitudinal axis A. The grommet 20 of FIG. 4 is shown in a non-retracted, relaxed state or first position. Each of the arms 42 includes an inner surface 86 that is generally flush with the inner surface 34 of the wall 36 in the first state (see FIG. 8). Each of the arms 42 further includes an upper surface 88, which extend outwardly from the inner surface 86 and joins an angled ledge 90. Moreover, each of the arms 42 include a finger 92 extending upwardly from the upper surface 88 of the arms 42. The finger 92 can extend into the central segment 62 of the windows 58 and may comprise a depression 94 extending into each of the fingers 92. The fingers 92 may assist in installation of the grommet 20.

Referring still to FIGS. 3 and 4, the angled ledge 90 extends away from the fingers 92 and concludes at a flat surface or elbow 96 of the arms 42. The elbow 96 is made up of a flat surface defining an arc shape profile that is positioned adjacent the angled ledge 90. Further, the elbow 96 terminates at an angled wall 98 which intersects with the outer surface 84 of the body 22 at the flexure joint 80. The angled ledge 90, the elbow 96, and the angled wall 98 are arched in a similar configuration as the cylindrical body 22 of the grommet 20. That is, the surface of the angled ledge 90, the elbow 96, and the angled wall 98 may be parallel with a circumference defined by the body 22 of the grommet 20.

Referring specifically to FIGS. 3 and 4, the angled wall 98 of each of the arms 42 includes a feedback feature or protrusion 130 positioned on and extending from the angled wall 98. The protrusion 130 is rounded and defines a semi-circular cross section or shape. Moreover, the protrusion 130 extends outwardly from the angled wall 98, and the protrusion 130 defines an arch like profile extending around the angled wall 98, generally parallel with the circumference defined by the wall 36 of the body 22. Further, the protrusion 130 extends an entire width of the arm 42. In alternative embodiments, the protrusion 130 can be any shape and may comprise more or less material then shown. Moreover, the angled wall 98 of the arms 42 and the protrusion 130 can be offset with respect to the outer surface 84 of the body 22 in the relaxed state. In the relaxed state, the elbow 96 may be positioned farther away from the longitudinal axis A of the body 22 than the feedback feature or protrusion 130. As will become more apparent upon further discussion herein, the protrusion 130 assists an operator in securing the grommet 20 to the component 50.

Figure 5:
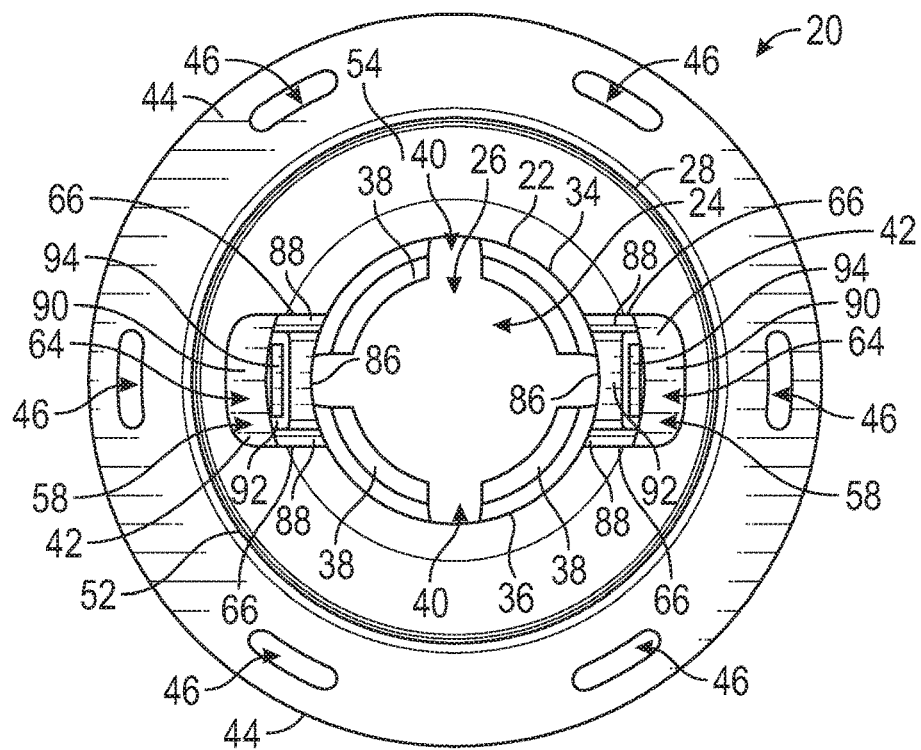
FIG. 5 is a top plan view of the grommet of FIG. 1.
Figure 6:
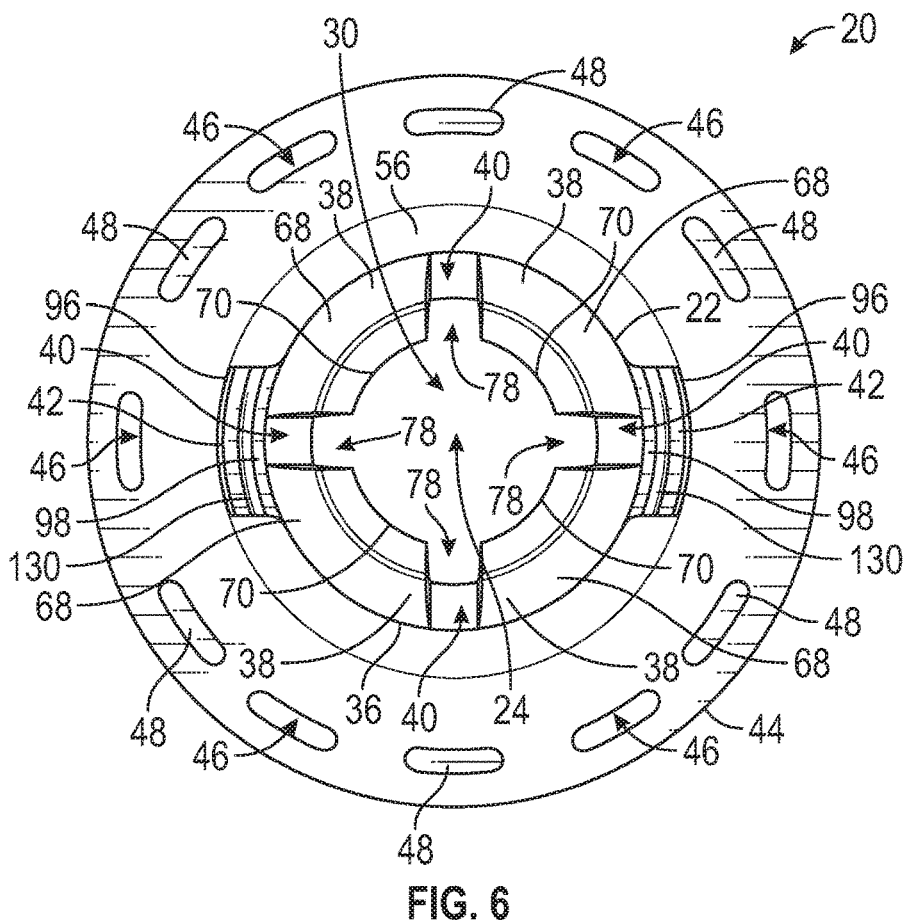
FIG. 6 is a bottom plan view of the grommet of FIG. 1.

Referring to FIGS. 5 and 6, top and bottom plan views of the grommet 20 are illustrated. Referring specifically to FIG. 6, the arch-shaped profile of the protrusion 130 and the angled wall 98 of the arms 42 can be seen. Additionally, when viewing FIG. 5, the passageway 24 that extends through the body 22 can be more clearly seen.

Figure 7:
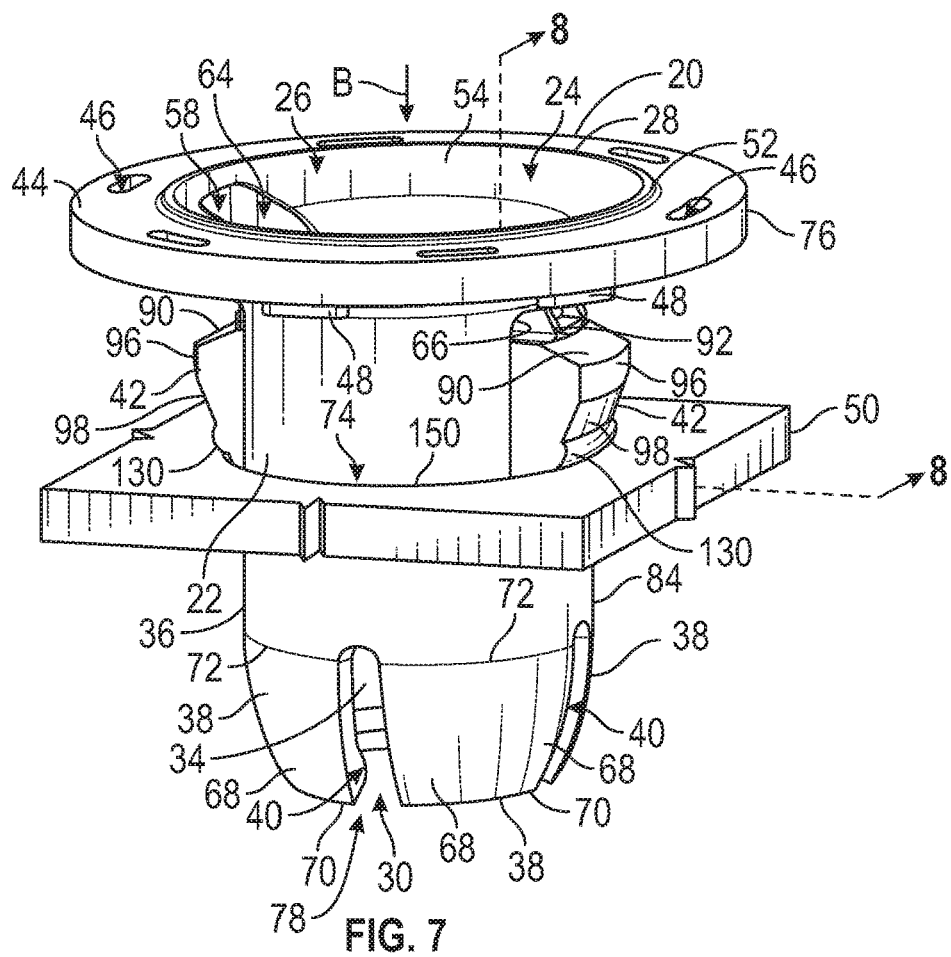
FIG. 7 is a top isometric view of the grommet of FIG. 1 initially inserted into a component.

Referring to FIG. 7, the grommet 20 is shown aligned and partially inserted into the aperture 74 of the component 50. The component 50 can be any shape and may comprise any type of panel, such as a plastic panel, an aluminum panel, or a metal panel, for example. Further, the aperture 74 may comprise internal edges 150 that define the perimeter of the aperture 74 (see FIG. 8).

Prior to being partially inserted in FIG. 7, the grommet 20 is aligned with the aperture 74 of the component 50. Once aligned, the grommet 20 is urged into the aperture 74 in the direction of arrow B. Upon urging of the grommet 20, the legs 38 guide the grommet 20 into a centered position with respect to the aperture 74 by aligning with the internal edges 150 of the aperture 74. The internal edges 150 of the aperture 74 can slide over the extension beams 68 of the legs 38, resulting in the body 22 of the grommet 20 sliding through the aperture 74 of the component 50.

Figure 8:
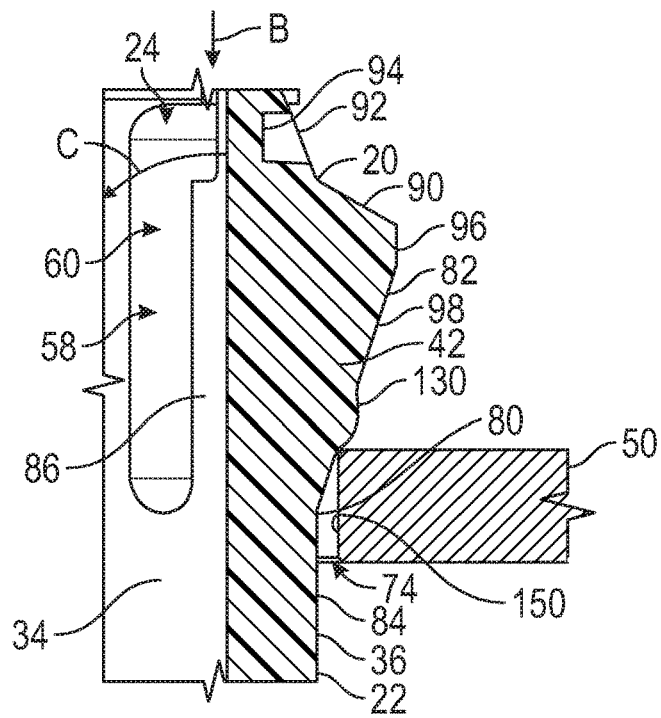
FIG. 8 is an enlarged, partial, elevational cross-sectional view taken through line 8-8 of FIG. 7.

Referring now to FIGS. 7 and 8, the grommet 20 is shown in contact with the component 50. In this embodiment, the grommet 20 is allowed to easily slide through the aperture 74 of the component 50 until the internal edges 150 of the aperture 74 make contact with the arms 42 of the grommet 20. As seen in FIG. 8, the component 50 is positioned right below the protrusion 130 of the arms 42, and the internal edges 150 of the aperture 74 are caught by the feedback feature or protrusion 130. Once in this position, the grommet 20 will require additional force to be fully inserted into the component 50. Therefore, the protrusion 130 acts as a catch point or feedback feature that causes hesitation in the installation process. This hesitation requires the operator to exert a higher force to overcome the protrusion 130.

As the operator increases the force on the grommet 20 in the direction of arrow B, the arms 42 of the body 22 begin to flex inwardly in the direction of arrow C. Upon a continued increase of force on the grommet 20, the internal edges 150 of the aperture 74 begin to slide over the protrusion 130, causing further deflection of the arms 42 in the direction of arrow C, i.e., defining a second position or retracted state in which the elbow 96 may be vertically aligned with the feedback feature or protrusion 130. As the internal edges 150 of the aperture 74 ride over the protrusion 130, the necessary force that results in overcoming the protrusion 130 causes a quick release in the grommet 20. Therefore, as a result of the necessary force to overcome the protrusion 130, the internal edges 150 of the aperture 74 quickly ride up and over the elbow 96 of the arms 42. As the internal edges 150 of the aperture 74 ride over the elbow 96 of the arms 42, the arms 42 flex back to an at-rest configuration, and the angled ledge 90 hooks the grommet 20 to the component 50. Thus, the internal edges 150 that define the aperture 74 are trapped between the angled ledge 90 of the arms 42 and the collar 44 of the body 22 (see FIG. 9).

The addition of the protrusion 130 to each of the arms 42 of the grommet 20, results in a hesitation buildup of force on the grommet 20. This buildup of force, results in the grommet 20 being able to quickly snap or slap into the aperture 74 of the component 50. Further, the buildup of force by the protrusion 130 allows the internal edges 150 of the aperture 74 to quickly overcome the rest of the angled wall 98 and elbow 96 of the arms 42. Put differently, the force required for the arms 42 to reach a fully deflected state, i.e., allow the internal edges 150 of the component 50 to pass over the elbow 96 of the arms 42, can be obtained by clearing the protrusion 130. Therefore, once the internal edges 150 of the aperture 74 make its way over the protrusion 130, the entire grommet 20 can come crashing down on the component 50 and fully seal itself thereon. As a result, the operator will feel a quick increase in force that will disappear immediately after. This rapid increase and decrease in force, provides the operator with a clear tactile feedback during installation. Further, the result of the grommet 20 crashing down on the component 50, additionally results in an audible feedback to the operator. This tactile and audible feedback provided to the operator by the grommet 20 can result in a more efficient manufacturing process.

Figure 9:
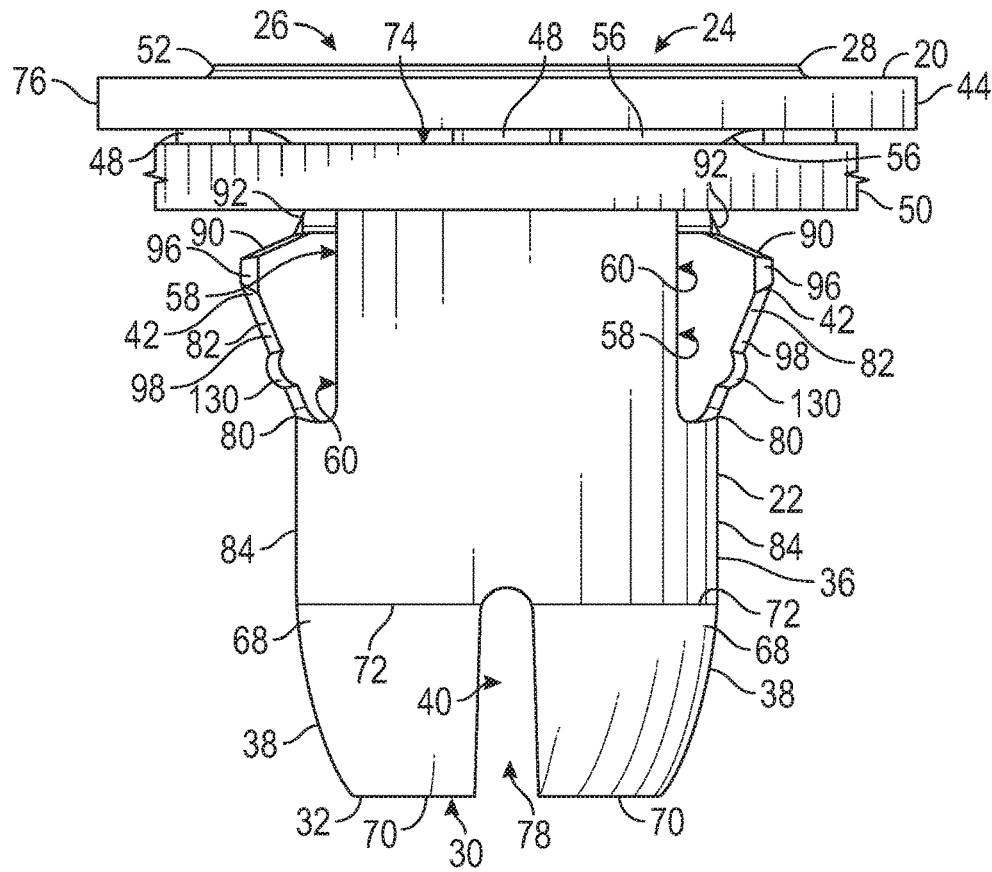
FIG. 9 is a front elevational view of the grommet of FIG. 1 installed in the component.

Referring to FIG. 9, the grommet 20 is shown installed in the component 50. In this configuration, the component 50 is positioned adjacent to the collar 44 of the upper end 28 of the body 22. Additionally, the nubs 48 of the collar 44 may be in contact with the component 50 and further secure the grommet 20 to the component 50. As discussed above, the component 50 is trapped between the collar 44 and the arms 42 of the grommet 20. As seen in FIG. 9, the grommet 20 is only pressed onto one component 50. In alternative embodiments, the grommet 20 may be secured to multiple components in order to fasten the multiple components together. As noted herein, the grommet 20 can be used for any number of components, and the grommet 20 may be customizable depending on its intended function.

Figure 10:
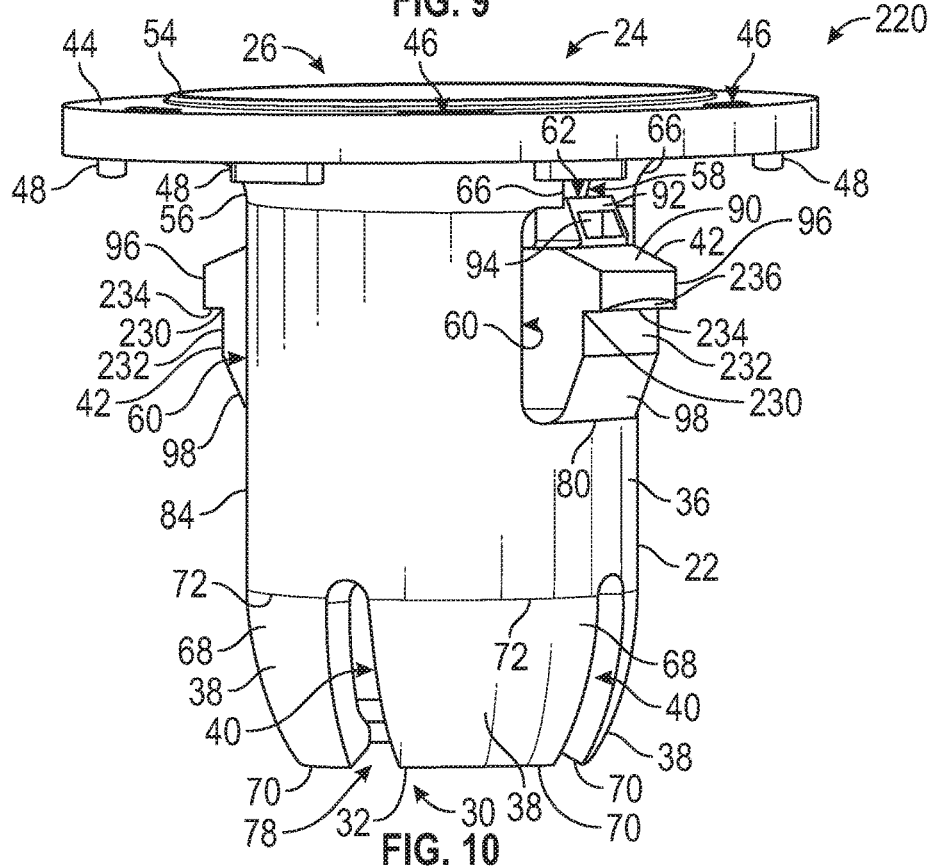
FIG. 10 is a top isometric view of another embodiment of a grommet.
Figure 11:
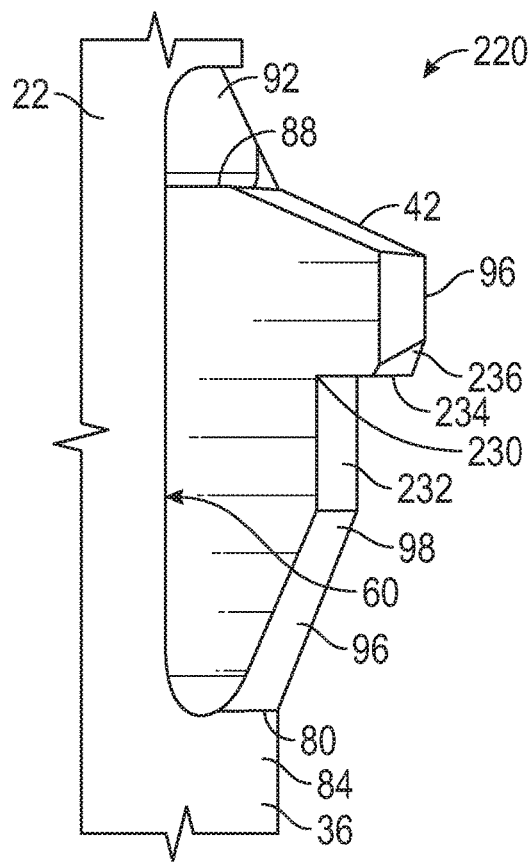
FIG. 11 is a partial, front, enlarged view of the grommet of FIG. 10.

Referring now to FIGS. 10 and 11, like reference numbers are used with regard to an alternative embodiment of a fastener or grommet 220. The grommet 220 may comprise a similar configuration as discussed above. However, in this embodiment, the arms 42 of the grommet 220 may comprise a notch 230 extending into the arms 42 of the grommet 220. As seen in FIG. 11, the notch 230 of the arms 42 extend into the angled wall 98 of the arms 42. The notch 230 can comprise a vertical wall 232 that may be generally parallel with the longitudinal axis A (see FIG. 12) and a horizontal wall 234 extending generally perpendicular to the vertical wall 232. Further, a lip 236 may be positioned just below the elbow 96 of the arms 42, and the lip 236 may be positioned in contact with the horizontal wall 234. In this embodiment, the lip 236 and the notch 230 may define a generally arched shape profile. Additionally, in other embodiments the notch 230 may comprise angled features or surfaces that allow for easier transitions between the arms 42 and the internal edges 150 of the aperture 74.

Figure 12:
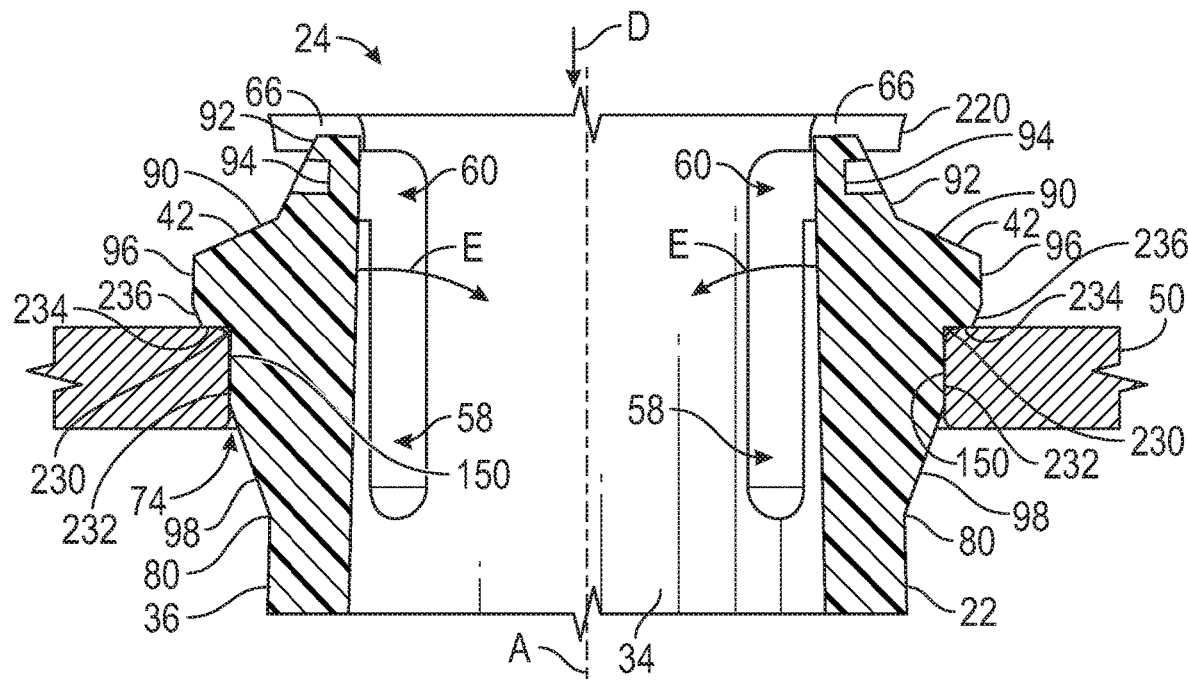
FIG. 12 is a partial, front cross-sectional view of the grommet of FIG. 10 initially inserted into a component.

Referring now to FIG. 12, the grommet 220 is shown initially inserted into the component 50. Prior to FIG. 12 and similarly as discussed above with respect to the grommet 20 of FIGS. 1-9, the grommet 220 is initially aligned with the aperture 74 of the component 50. Once aligned, the grommet 220 is urged into the aperture 74 in the direction of arrow D until the internal edges 150 of the aperture 74 make contact with the arms 42 of the grommet 220. As the grommet 220 is urged into the aperture 74 of the component 50, the arms 42 of the grommet 220 begin to flex inwardly in the direction of arrow E, similar to the direction of arrow C in FIG. 8. Upon continued urging and as seen in FIG. 12, the internal edges 150 of the aperture 74 may get trapped in the notch 230 of the arms 42. In this position, the internal edges 150 of the aperture 74 may be in contact with the vertical wall 232 and/or the horizontal wall 234 of the notch 230.

Similar to the protrusion 130 discussed above, the notch 230 acts as a catch point or feedback feature that causes hesitation in the installation process. This hesitation requires the operator to exert a higher force to overcome the notch 230. As the operator increases the force on the grommet 220 in the direction of arrow D, the arms 42 of the body 22 further continue to flex inwardly in the direction of arrow E. Upon a continued increase of force on the grommet 220, the internal edges 150 of the aperture 74 may begin to slide over the horizontal wall 234 of the notch 230, causing the arms 42 to define a retracted state. As the internal edges 150 of the aperture 74 ride over the horizontal wall 234 of the notch 230, the necessary force that results in overcoming the notch 230 causes a quick release in the grommet 220. As such, the internal edges 150 of the aperture 74 quickly ride up and over the lip 236 and the elbow 96 of the arms 42. As the internal edges 150 of the aperture 74 ride over the elbow 96 of the arms 42, the arms 42 flex back to an at-rest configuration, and the angled ledge 90 hooks the grommet 220 to the component 50. Therefore, the internal edges 150 that define the aperture 74 can be trapped between the angled ledge 90 of the arms 42 and the collar 44 of the body 22.

Similarly as discussed above with respect to the protrusion 130, the notch 230 results in a hesitation buildup of force on the grommet 220. This buildup of force results in the grommet 220 being able to quickly snap or slap into the aperture 74 of the component 50. Further, the buildup of force by the notch 230 allows the internal edges 150 of the aperture 74 to quickly overcome the lip 236 and the elbow 96 of the arms 42. Put differently, the force required for the arms 42 to reach a fully deflected state, i.e., allow the internal edges 150 of the component 50 to pass over the elbow 96 of the arms 42, can be obtained by just clearing the notch 230. Therefore, once the internal edges 150 of the aperture 74 make its way over the notch 230, the entire grommet 220 can come crashing down on the component 50 and fully seal itself thereon. As a result, the operator may feel a quick increase in force that can disappear immediately after. This rapid increase and decrease in force, provides the operator with a clear tactile feedback during installation. Further, the result of the grommet 220 crashing down on the component 50, results in an audible feedback to the operator. This tactile and audible feedback provided to the operator by the grommet 220 can result in a more efficient manufacturing process.

Figure 13:
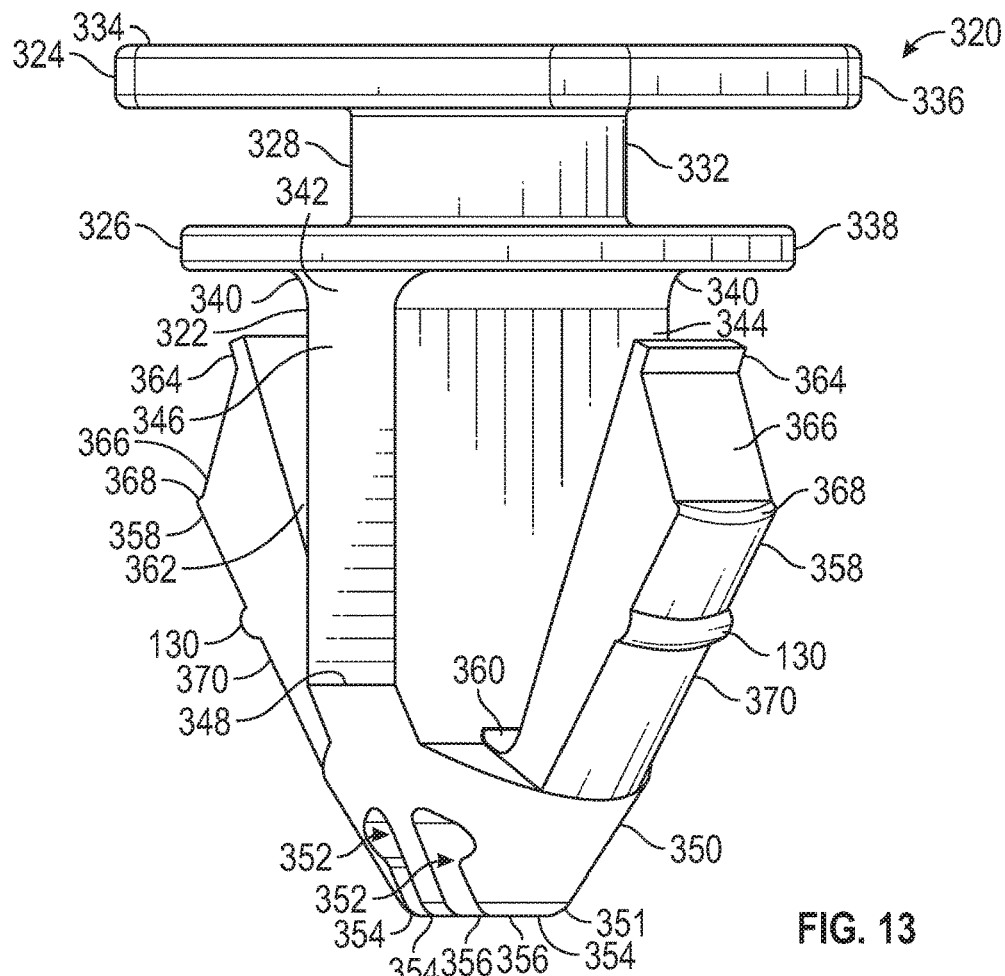
FIG. 13 is a top isometric view of yet another embodiment of a grommet.
Figure 14:
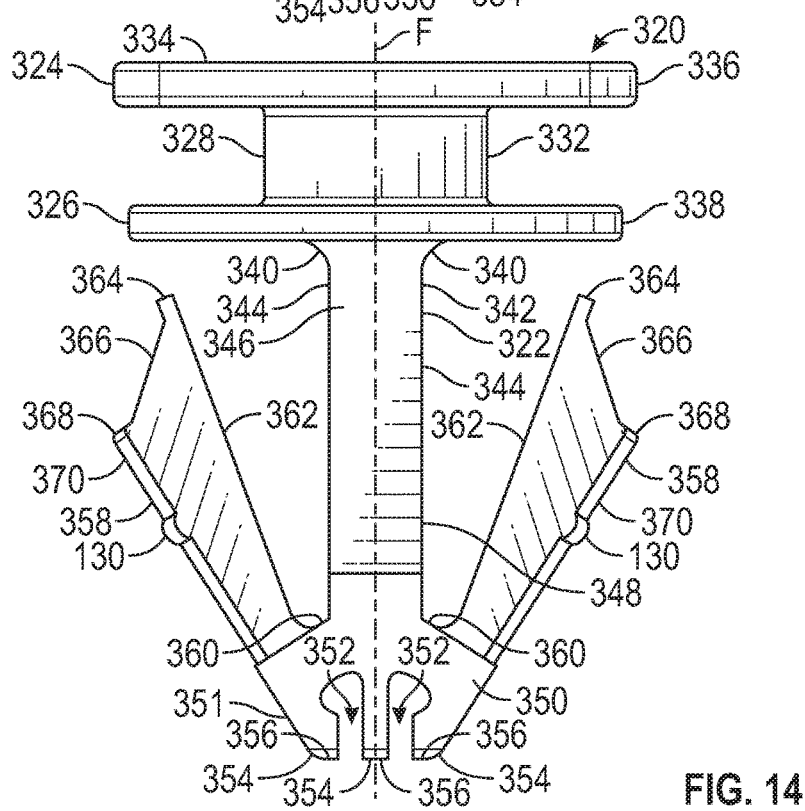
FIG. 14 is a front elevational view of the grommet of FIG. 13.

Referring now to FIGS. 13 and 14, like reference numbers are used with regard to an alternative embodiment of a fastener or grommet 320. FIGS. 13 and 14 illustrate a top perspective view and a front view of the grommet 320 that can include a body 322, the body 322 being generally rectangular. The grommet 320 may be integrally molded and formed as a single piece of material, such as injection-molded plastic. Further, the grommet 320 may include a rectangular flange 324 and a shoulder 326 extending at an upper end 328 of the grommet 320 with a neck 332 positioned therebetween. The flange 324 may comprise a substantially flat top end 334 and may comprise a sidewall 336 extending around the entire flange 324. As noted herein, the sidewall 336 may define a generally rectangular configuration for the flange 324 (see FIG. 16).

Referring again to FIGS. 13 and 14, the neck 332 extends down from the flange 324 and may comprise a generally cylindrical cross-section. In the present embodiment, the neck 332 terminates at the shoulder 326 of the body 322 which may also define a generally disk like configuration and may comprise a circular cross section (see FIG. 16). Further, the shoulder 326 may comprise a sidewall 338 extending around the entire shoulder 326. As noted herein, the upper portion 328 of the grommet 320 may be used to secure an additional component thereto. Therefore, the flange 324 and the shoulder 326 may comprise a component, such as a panel, therebetween. In alternative embodiments, the flange 324 and the shoulder 326 may comprise any configuration or shape, such as a square, oval, or triangle, for example.

Figures 15, 16:
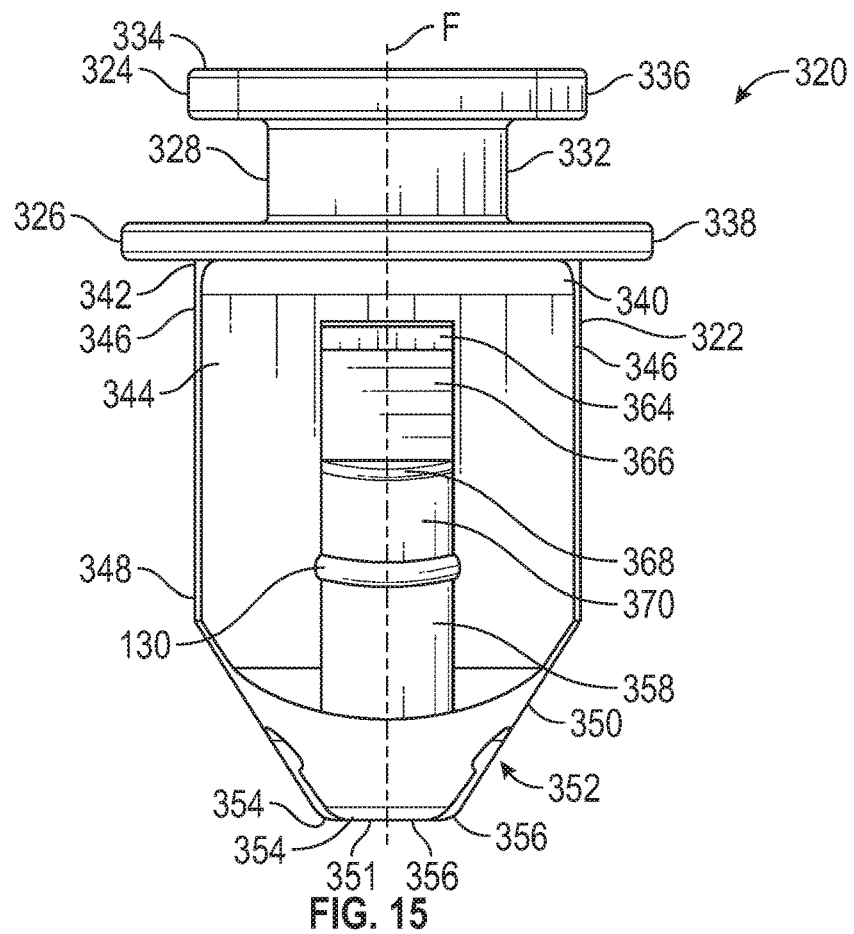
FIG. 15 is a side elevational view of the grommet of FIG. 13.
FIG. 16 is a bottom plan view of the grommet of FIG. 13.

Referring to FIGS. 14 and 15, the body 322 of the grommet 320 is shown more clearly, and a pair of fillets 340 that form a connection between the shoulder 326 and the body 322 are illustrated. The fillets 340 are formed on an upper end 342 of the body 322 and extend horizontally or perpendicular to a longitudinal axis F. In this embodiment, the body 322 of the grommet 320 is generally rectangular and comprises two flat surfaces 344 and two rounded surfaces 346 therebetween. Near a bottom end 348 of the body 322, the body 322 may comprise a nose 350 extending downwardly and defining a generally frusto-conical profile. The nose is situated at a bottom end 351 of the grommet 320. Further, the nose 350 may comprise a pair of slots 352 extending through the nose 350 perpendicular to the longitudinal axis F. In alternative embodiments, the nose 350 may include more or fewer slots 352 extending through the nose 350. Further, the slots 352 may comprise any shape or configuration.

Referring still to FIGS. 14 and 15, the nose 350 may further comprise a plurality of protuberances 354 extending downwardly from the nose 350. The protuberances 354 can be defined by the slots 352 extending through the nose 350 and can include a flat end 356. As will be discussed in further detail below, the protuberances 354 may flex inwardly depending on the size of the aperture 74 of the component 50. Continuing on, the grommet 320 may comprise a pair of arms 358 extending outwardly away from the body 322. In alternative embodiments, the grommet 320 may comprise any number of arms 358, such as three or four arms 358, which extend from the nose 350 and body 322. The arms 358 are positioned on opposing sides of the body 322, and only one of the arms 358 will be described hereinafter for ease of description.

Referring specifically to FIGS. 14 and 15, front and side elevation views of the grommet 320 are shown. Referring specifically to FIG. 14, the arm 358 may comprise a flexure joint 360 that allows the arm 358 to pivot inwardly and outwardly with respect to the body 322. The joint 360 can be connected with the body 322 of the grommet 320 and may partially extend into the nose 350. In this embodiment, the arm 358 can comprise an interior surface 362 that may face the body 322. During installation, a portion of the interior surface 362 of the arm 358 may make contact with a portion of the body 322 when the arm 358 is in a deflected state. The interior surface 362 of the arm 358 can extend the entire length of the arm 358 and may terminate at a finger 364 of the arm 358. The finger 364 may extend outwardly at an angle from the arm 358, and the finger 364 can be attached to an angled ledge 366, which slopes downwardly toward a lip 368 of the arm 358. The lip 368 may extend outwardly from the angled ledge 366. In some embodiments, the lip 368 may be the farthest portion of the grommet 320 away from the longitudinal axis F (see FIG. 14). Further, the arm 358 may comprise an angled wall 370 extending downwardly toward the nose 350. In one embodiment, the arm 358 may comprise the protrusion 130 extending out of the angled wall 370. Similarly as discussed above, the angled wall 370 and the protrusion 130 may comprise a generally rounded or arch like surface, and when viewed from FIG. 15, the protrusion 130 may define a generally convex configuration.

Referring to FIG. 16, a bottom of the grommet 320 is shown in greater detail. As illustrated in FIG. 16, the arch like shape of the angled wall 370 and the protrusion 130 can be shown. Further, the flat ends 356 of the protuberances 354 can be shown extending from the nose 350. Specifically referring to FIGS. 14 and 16, the arms 358 of the grommet 320 define a generally arrow head type shape, and the arms 358 of the grommet 320 may extend out at approximately a 30° angle. However, in alternative embodiments, the arms 358 may extend at any range between 10°-70°.

Figure 17:
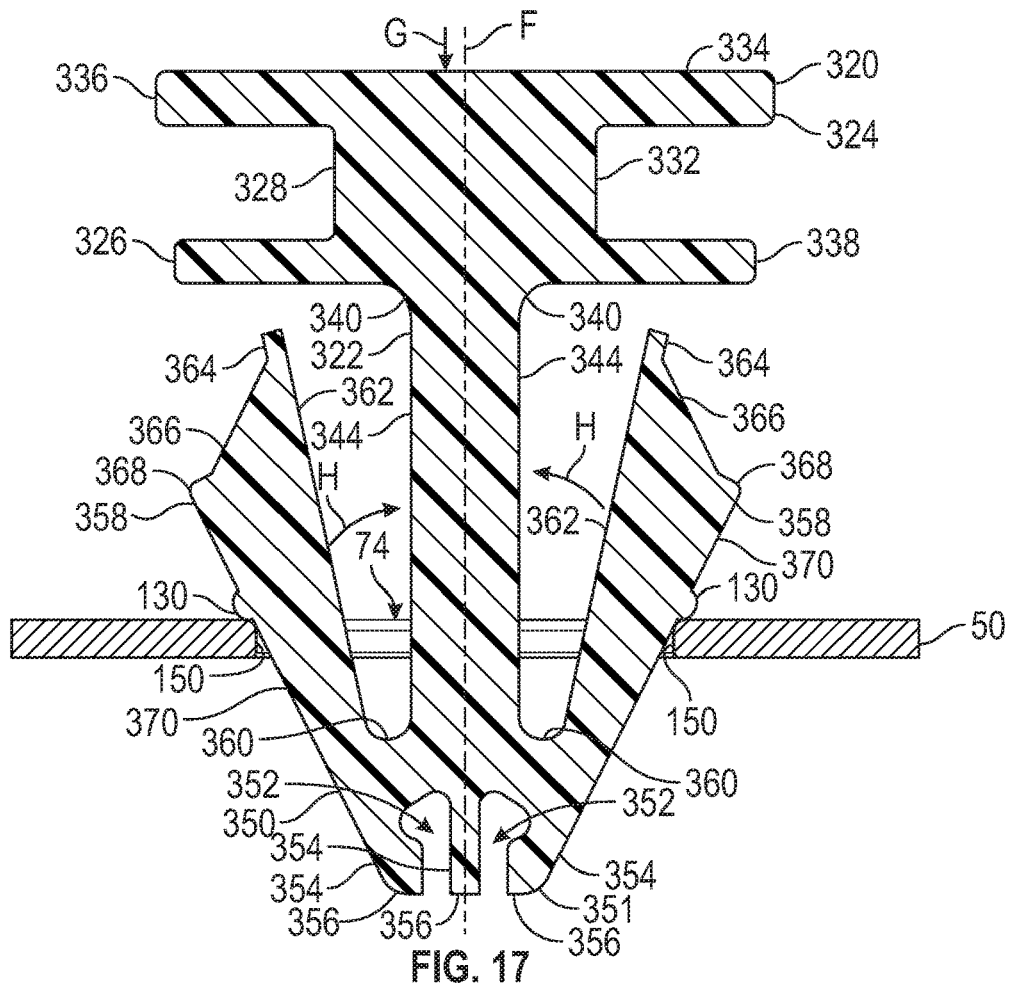
FIG. 17 is a front cross-sectional view of the grommet of FIG. 13 initially inserted into a component.

Referring to FIG. 17, a cross-sectional view of the grommet 320 is shown aligned and partially inserted into the aperture 74 of the component 50. Prior to being partially inserted in FIG. 17, the grommet 320 is aligned with the aperture 74 of the component 50. Once aligned, the grommet 320 is urged into the aperture 74 in the direction of arrow G. Upon continued urging of the grommet 320, the nose 350 and the angled wall 370 of the arms 358 guide the grommet 320 into a centered position, with respect to the aperture 74, by aligning with the internal edges 150 of the aperture 74. The internal edges 150 of the aperture 74 can slide past the nose 350 of the body 322 and up the angled wall 370 of the arms 358.

Figure 18:
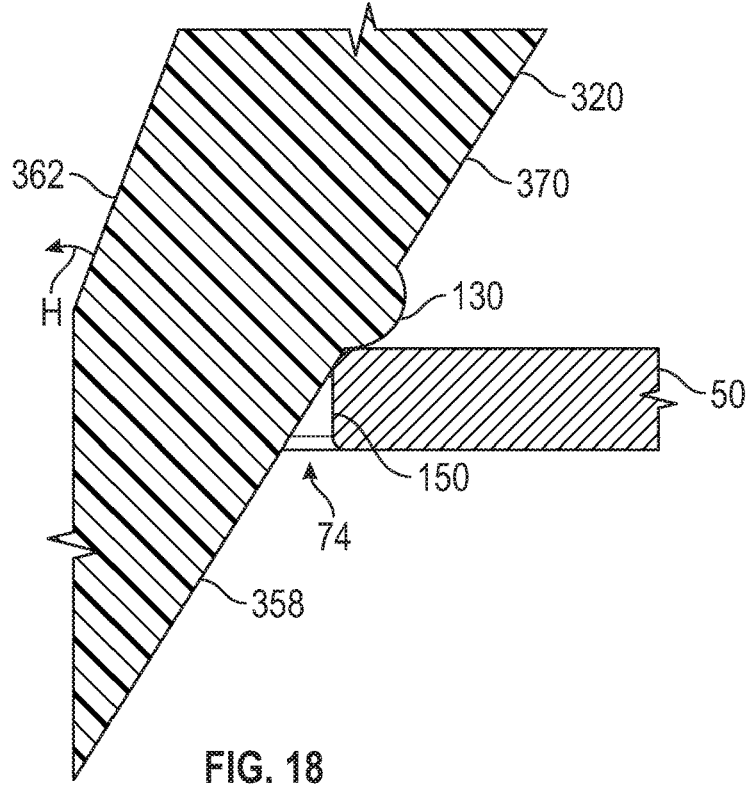
FIG. 18 is an enlarged view of a section of FIG. 17.

Referring now to FIGS. 17 and 18, the grommet 320 is shown in contact with the component 50. As seen in FIG. 18, the component 50 is positioned right below the protrusion 130 of the arms 358. Once in this position, the grommet 320 will require additional force to be fully inserted into the component 50. Therefore, as similarly discussed above, the protrusion 130 of the arms 358 act as a catch point or feedback feature that causes hesitation in the installation process. This hesitation requires the operator to exert a higher force to overcome the protrusion 130.

As the operator increases the force on the grommet 320 in the direction of arrow G, the arms 358 begin to flex inwardly in the direction of arrow H. Upon a continued increase of force on the grommet 320, the internal edges 150 of the aperture 74 begin to slide over the protrusion 130, causing further deflection of the arms 358 in the direction of arrow H. As the internal edges 150 of the aperture 74 ride over the protrusion 130, the necessary force resulting in overcoming the protrusion 130 causes a quick release in the grommet 320. As a result of the necessary force to overcome the protrusion 130, the internal edges 150 of the aperture 74 quickly ride up the angled wall 370, resulting in further deflection of the arms 358 in the direction of arrow H.

Moreover, the internal edges 150 will then ride over the lip 368 of the arms 358. As the internal edges 150 of the aperture 74 ride over the lip 368 of the arms 358, the arms 358 may start to slightly flex back to their original at-rest configuration. Once over the lip 368, the internal edges 150 of the aperture 74 will continue to run along the angled ledge 366 and over the finger 364 of the arms 358. As the internal edges 150 of the aperture 74 ride over the finger 364 of the arms 358, the arms 358 may flex back to an at-rest configuration, and the finger 364 and the angled ledge 366 may hook the grommet 320 to the component 50. As such, the internal edges 150 that define the aperture 74 are trapped between the finger 364 of the arms 358 and the shoulder 326 of the grommet 320 (see FIG. 19).

As discussed above, the addition of the protrusion 130 to each of the arms 358 of the grommet 320, results in a hesitation buildup of force on the grommet 320, similar to the previous embodiments. This buildup of force results in the grommet 320 being able to quickly snap or slap into the aperture 74 of the component 50. Further, the buildup of force by the protrusion 130 allows the internal edges 150 of the aperture 74 to quickly overcome the rest of the angled wall 370, the lip 368, the angled ledge 366, and the finger 364 of the arms 358. Put differently, the force required for the arms 358 to reach a fully deflected state, i.e., allow the internal edges 150 of the component 50 to pass over the lip 368 of the arms 358, can be obtained by just clearing the protrusion 130. Therefore, once the internal edges 150 of the aperture 74 make its way over the protrusion 130, the entire grommet 320 can come crashing down on the component 50 and fully seal itself therebetween. As a result, the operator may feel a quick increase in force that may disappear immediately after. This rapid increase and decrease in force provides the operator with a clear tactile feedback during installation. Further, the result of the grommet 320 crashing down on the component 50, results in an audible feedback to the operator. This tactile and audible feedback provided to the operator by the grommet 320 can result in a more efficient manufacturing process.

Figure 19:
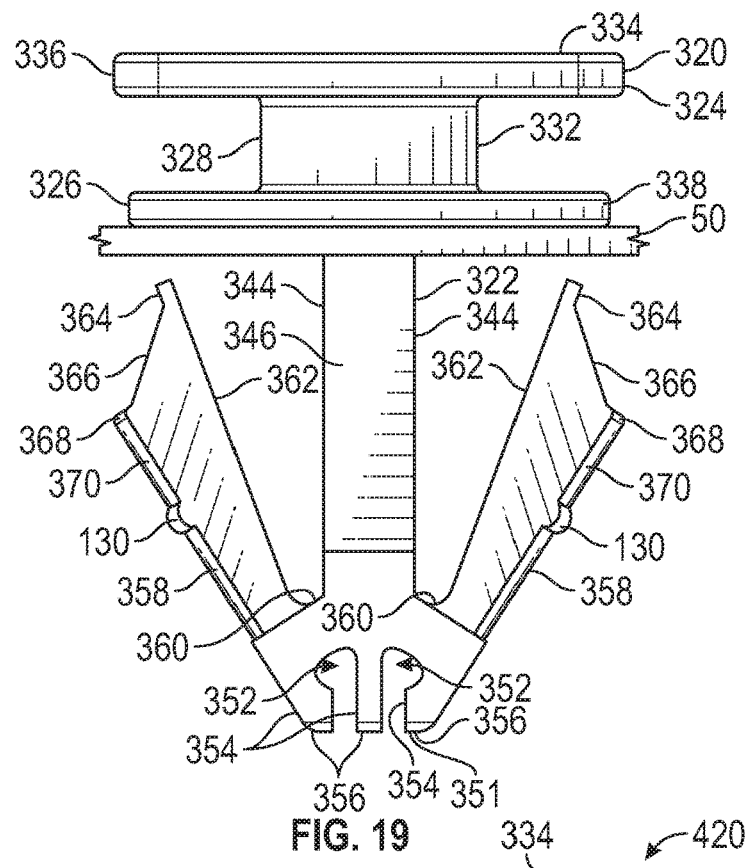
FIG. 19 is a front elevational view of the grommet of FIG. 13 installed in a component.

Referring to FIG. 19, the grommet 320 is shown installed in the component 50. In this configuration, the component 50 is positioned against a lower face of the shoulder 326 of the grommet 320. As discussed above, the component 50 is trapped between the shoulder 326 and the arms 358 of the grommet 320. As seen in FIG. 19, the grommet 320 is only pressed onto one component 50. In alternative embodiments, the grommet 320 may be secured to multiple components in order to fasten the two or more components together. As noted herein, the grommet 320 can be used with any number of components, and the grommet 320 may be customizable depending on the job it is needed to perform. As discussed above, the grommet 320 may also comprise a component secured between the flange 324 and the shoulder 326 prior to securing the grommet 320 to the component 50.

Figure 20:
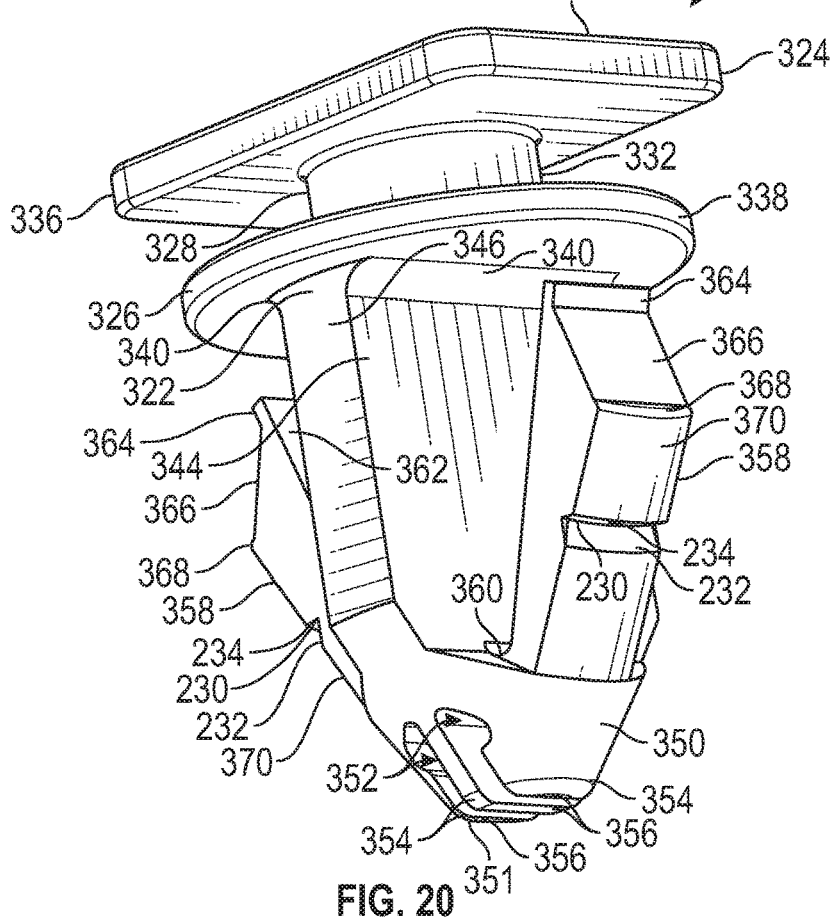
FIG. 20 is a bottom isometric view of still another embodiment of a grommet.
Figure 21:
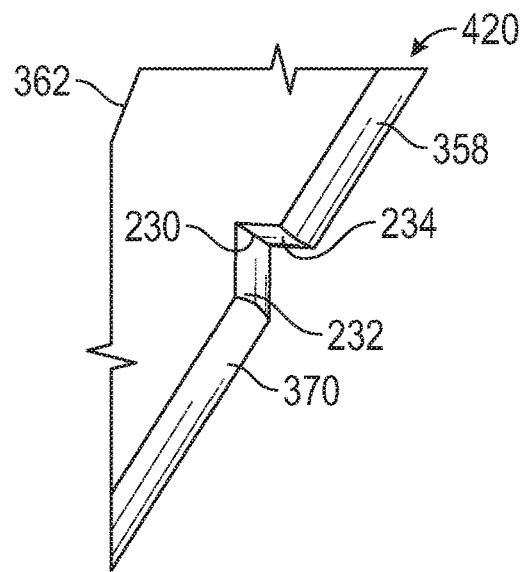
FIG. 21 is a partial, front, enlarged view of the grommet of FIG. 20.

Referring now to FIG. 20, like reference numbers are used with regard to an alternative embodiment of a fastener or grommet 420. The grommet 420 may comprise a similar configuration as discussed above. However, in this embodiment, the arms 358 of the grommet 420 may comprise the notch 230 extending into the arms 358 of the grommet 420. As seen in FIG. 21, the notch 230 of the arms 358 extend into the angled wall 370 of the arm 358. The notch 230 can comprise the vertical wall 232 that may be generally parallel with the longitudinal axis F (see FIG. 22) and the horizontal wall 234 extending generally perpendicular to the vertical wall 232. Further, the vertical wall 232 may be arched, similar to the angled wall 370 of the arms 358. In alternative embodiments, the notch 230 may comprise angled features or surfaces that allow for easier transitions between the arms 358 and the internal edges 150 of the aperture 74.

Figure 22:
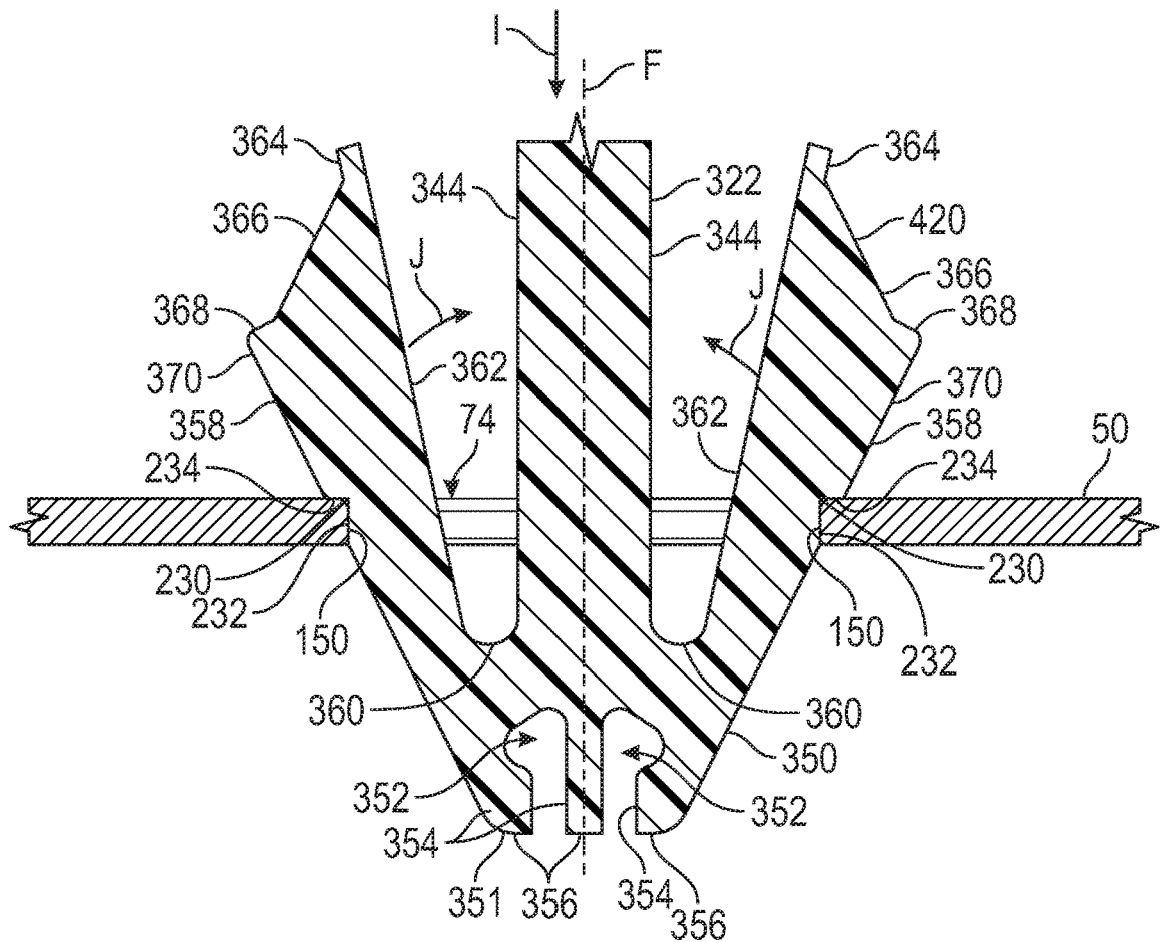
FIG. 22 is a front cross-sectional view of the grommet of FIG. 20 initially inserted into a component.

Referring now to FIG. 22, a cross-sectional view of the grommet 420 is shown initially inserted into the component 50. Prior to FIG. 22 and similarly as discussed above with respect to the grommet 320 of FIGS. 13-19, the grommet 420 is initially aligned with the aperture 74 of the component 50. Once aligned, the grommet 420 is urged into the aperture 74 in the direction of arrow I until the internal edges 150 of the aperture 74 make contact with the arms 358 of the grommet 420. As the grommet 420 is continually urged into the aperture 74 of the component 50, the arms 358 of the grommet 420 begin to flex inwardly in the direction of arrow J. Upon further urging, the internal edges 150 of the aperture 74 may get trapped in the notch 230 of the arms 358. In this position, the internal edges 150 of the aperture 74 may be in contact with the vertical wall 232 and/or the horizontal wall 234 of the notch 230. Similar to the notch 230 discussed above, the notch 230 acts as a catch point or feedback feature that causes hesitation in the installation process. This hesitation requires the operator to exert a higher force to overcome the notch 230.

As the operator increases the force on the grommet 420 in the direction of arrow I, the arms 358 of the body 322 continue to flex inwardly in the direction of arrow J. Upon a continued increase force on the grommet 420, the internal edges 150 of the aperture 74 may begin to slide over the horizontal wall 234 of the notch 230, causing the arms 358 to define a deflected state. As the internal edges 150 of the aperture 74 ride over the horizontal wall 234 of the notch 230, the necessary force that results in overcoming the notch 230 causes a quick release in the grommet 420. As such, the internal edges 150 of the aperture 74 quickly ride up and over the angled wall 370 and fully over the lip 368, the angled ledge 366, and the fingers 364 of the arms 358. As the internal edges 150 of the aperture 74 ride over the fingers 364 of the arms 358, the arms 358 flex back to an at-rest configuration, and the fingers 364 hook the grommet 420 to the component 50. As such, the internal edges 150 that define the aperture 74 are trapped between the fingers 364 of the arms 358 and the shoulder 326 of the grommet 420.

Similarly as discussed above with respect to the notch 230, the notch 230 results in a hesitation buildup of force on the grommet 420. This buildup of force, results in the grommet 420 being able to quickly snap or slap into the aperture 74 of the component 50. Further, the buildup of force by the notch 230 allows the internal edges 150 of the aperture 74 to quickly overcome the angled wall 370, the lip 368, the angled ledge 366, and the finger 364 of the arms 358. Put differently, the force required for the arms 358 to reach a fully deflected state, i.e., allow the internal edges 150 of the component 50 to pass over the lip 368 of the arms 358, can be obtained by just clearing the notch 230. Therefore, once the internal edges 150 of the aperture 74 make its way over the notch 230, the entire grommet 420 can come crashing down on the component 50 and fully seal itself therebetween. As a result, the operator may feel a quick increase in force that will disappear immediately after. This rapid increase and decrease in force, provides the operator with a clear tactile feedback during installation. Further, the result of the grommet 420 crashing down on the component 50, results in an audible feedback to the operator. This tactile and audible feedback provided to the operator by the grommet 420 can result in a more efficient manufacturing process.

While the grommet feedback feature 130, 230 described herein refers to the use of the protrusion 130 or notch 230 on specific fasteners or grommets 20, 220, 320, 420, the feedback feature 130, 230 may be added to any low insertion style clip or fastener to provide additional feedback to the operator. For example, the protrusion 130 or notch 230 may be added to a box prong, a W-base, or a heart flex configuration. Further, while the grommet feedback feature 130, 230 described herein refers to the use of the protrusion 130 or notch 230 formed in the arms 42, 358 of the grommet 20, 220, 320, 420, alternative structure may be used to serve as a catch point. For example, the feedback feature 130, 230 may comprise a rectangular protrusion, a triangular protrusion, a circular notch, a triangular notch, a flange, or the like. Furthermore, multiple feedback features 130, 230 may be used on a single arm 42, 358 of the grommet 20, 220, 320, 420. For example, each arm 42, 358 may comprise two or more notches 230 or protrusions 130 displaced throughout.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

We claim:

1. A grommet, comprising:
  a body defining a longitudinal axis and having a wall, the wall defining an inner surface;
  a collar extending from a first axial end of the body and away from the longitudinal axis;
  a plurality of legs extending from a second axial end of the body, the second axial end being opposite the first axial end of the body; and
  a plurality of arms extending from the body at flexure joints, each of the plurality of arms including a feedback feature that is configured as a catch point causing hesitation and quick release of the grommet during installation
  wherein the feedback feature is defined as a protrusion extending outwardly from an angled wall of each of the arms, the protrusion being arranged between an upper end and a lower end of the angled wall, and being semi-circular in a plane parallel to the longitudinal axis, and
  wherein the protrusion and the angled wall have an arched profile in a plane perpendicular to the longitudinal axis.

2. The grommet of claim 1, wherein the protrusion extends along an entire width of each of the plurality of arms.

3. The grommet of claim 2, wherein the protrusion is parallel with a circumference defined by the wall of the body.

4. The grommet of claim 1, wherein the feedback feature provides an audible and tactile feedback to an operator during installation.

5. The fastener of claim 1, wherein the collar includes a plurality of elongate apertures extending through the collar.

6. The fastener of claim 5, wherein the collar further includes a plurality of nubs extending downwardly from a bottom surface of the collar, the plurality of nubs being arranged between the plurality of elongate apertures.

7. A grommet, comprising:
  a body having a first axial end and a second axial end that is opposite the first axial end, the body including a wall that defines a passageway extending through the first axial end and the second axial end of the body;
  a plurality of arms extending from the body at flexure joints; and
  a feedback feature positioned on an angled wall on each of the plurality of arms, the feedback feature being configured as a catch point on a component, causing hesitation and quick release of the grommet during installation on the component,
  wherein the body includes a plurality of windows extending partially around the plurality of arms that are open to the first axial end of the body,
  wherein the feedback feature is defined as a protrusion extending outwardly from the angled wall of each of the arms, the protrusion being arranged between an upper end and a lower end of the angled wall, the protrusion being semi-circular in a plane parallel to the longitudinal axis, and
  wherein the protrusion and the angled wall having an arched profile in a plane perpendicular to the longitudinal axis that extends the entire width of each of the arms.

8. The grommet of claim 7, wherein the component has an aperture extending through the component, and wherein the aperture is defined by an internal edge.

9. The grommet of claim 8, wherein a portion of the internal edge of the aperture is engaged by the feedback feature.

10. The grommet of claim 7, wherein each of the plurality of arms have an angled ledge extending outwardly from the upper end of the angled wall, the angled ledge and the angled wall defining an elbow therebetween.

11. The grommet of claim 10, wherein the elbow is defined by a continuous surface that is parallel with a circumference defined by the body.

12. The grommet of claim 10, wherein each of the plurality of arms include a finger extending upwardly from an upper surface of each of the plurality of arms, the finger having a depression extending therein.

13. The grommet of claim 10, wherein each of the plurality of arms are flexible between a first position in which the elbow is positioned farther away from a longitudinal axis defined by the body than the feedback feature, and a second position in which the elbow is vertically aligned with the feedback feature.

14. A fastener, comprising:
   a body defining a longitudinal axis and including at least one wall; and
   two arms extending from the body on opposing sides at flexure joints, each of the arms including a feedback feature that is configured to cause hesitation in the fastener during installation,
   wherein the feedback feature is a protrusion extending outwardly from an angled wall of each of the arms, the protrusion being arranged between an upper end and a lower end of the angled wall, and being semi-circular in a plane parallel to the longitudinal axis, and
   wherein the protrusion and the angled wall have an arched profile in a plane perpendicular to the longitudinal axis that extends the entire width of each of the arms.

15. The fastener of claim 14, wherein the body comprises a plurality of windows extending partially around the two arms, the plurality of windows being open to a first axial end of the body.

* * * * *